United States Patent [19]

Hogie et al.

[11] Patent Number: 5,040,730
[45] Date of Patent: Aug. 20, 1991

[54] THRUST REVERSER DOOR HAVING AN EXHAUST GAS PASSAGE

[75] Inventors: Jean-Paul R. A. Hogie, Le Havre; Robert Standish, Rambouillet, France; Guy B. Vauchel, Le Havre, all of

[73] Assignees: Societe Hispano-Suiza, Saint Cloud; Societe de Constructio des Avions Hurel-Dubois, Meudon La Foret, both of France

[21] Appl. No.: 432,495

[22] Filed: Nov. 7, 1989

[30] Foreign Application Priority Data

Nov. 9, 1988 [FR] France .................................. 88 14606

[51] Int. Cl.$^5$ ............................................. B63H 25/46
[52] U.S. Cl. ................................... 239/265.23; 60/230
[58] Field of Search ...................... 239/265.19, 265.27, 239/265.29, 265.23; 60/226.2, 228, 230; 244/110 B

[56] References Cited

U.S. PATENT DOCUMENTS

| | | | |
|---|---|---|---|
| 4,093,122 | 6/1978 | Linderman et al. | 244/110 B X |
| 4,485,970 | 12/1984 | Fournier et al. | 244/110 B X |
| 4,858,430 | 8/1989 | Belbouche | 239/265.27 X |
| 4,916,895 | 4/1990 | Debois | 239/265.29 X |
| 4,922,712 | 5/1990 | Matta et al. | 60/226.2 |

Primary Examiner—Andres Kashnikow
Assistant Examiner—Kevin Weldon
Attorney, Agent, or Firm—Bacon & Thomas

[57] ABSTRACT

A thrust reverser door for a turbofan-type turobjet engine thrust reversing system is disclosed defining a gas flow passage between inner and outer panels of the door. The passae has an inlet formed through the inner panel of the thrust reverser door and an outlet, directs a portion of the gas flowing through a cold flow air duct in a forward direction. The gas flowing in the forward direction inpinges upon gases flowing through a laterally facing opening in the housing in order to provide a forward component to this gas flow. A moveable flap may be attached to the thrust reverser door in order to cover the inlet to the passageway when the device is operated in the forward thrust mode.

5 Claims, 7 Drawing Sheets

THRUST REVERSER DOOR HAVING AN EXHAUST GAS PASSAGE

BACKGROUND OF THE INVENTION

The present invention relates to a thrust reverser for a turbofan-type turbojet engine in which movable thrust reverser doors change the direction of the flow of the air passing through the cold-flow air duct to provide the requisite thrust reversing forces.

Turbofan-type turbojet engines are well known in the art and, typically, comprise an annular housing concentrically surrounding the turbojet engine housing to define an annular cold-flow air duct extending along the longitudinal axis of the engine. A fan, driven by the turbojet engine, is located in the upstream portion of the cold-flow air duct so as to force air through the duct to augment the thrust of the turbojet engine.

In turbofan-type turbojet engines having a relatively high bypass ratio, a thrust reversing device may be associated with the annular housing to redirect the air passing through the cold-flow air duct to provide the thrust reversing forces. It is known to provide one or more pivotable thrust reversing doors in the annular housing to redirect the cold flow air to provide the necessary thrust reversing forces.

Figure 1:
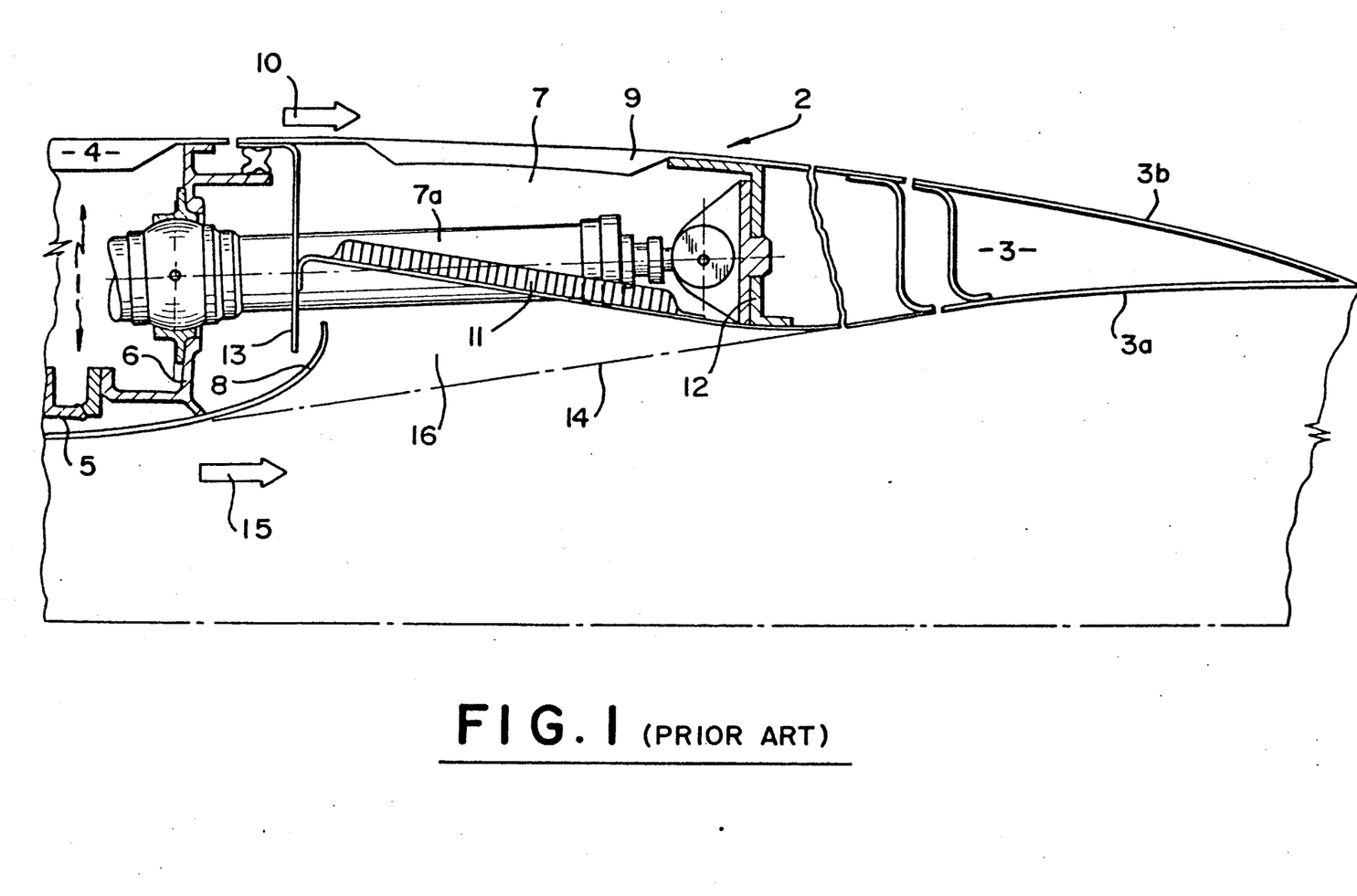
FIG. 1 is a partial, longitudinal cross-sectional view illustrating a thrust reverser door of a known type.
Figure 2A:
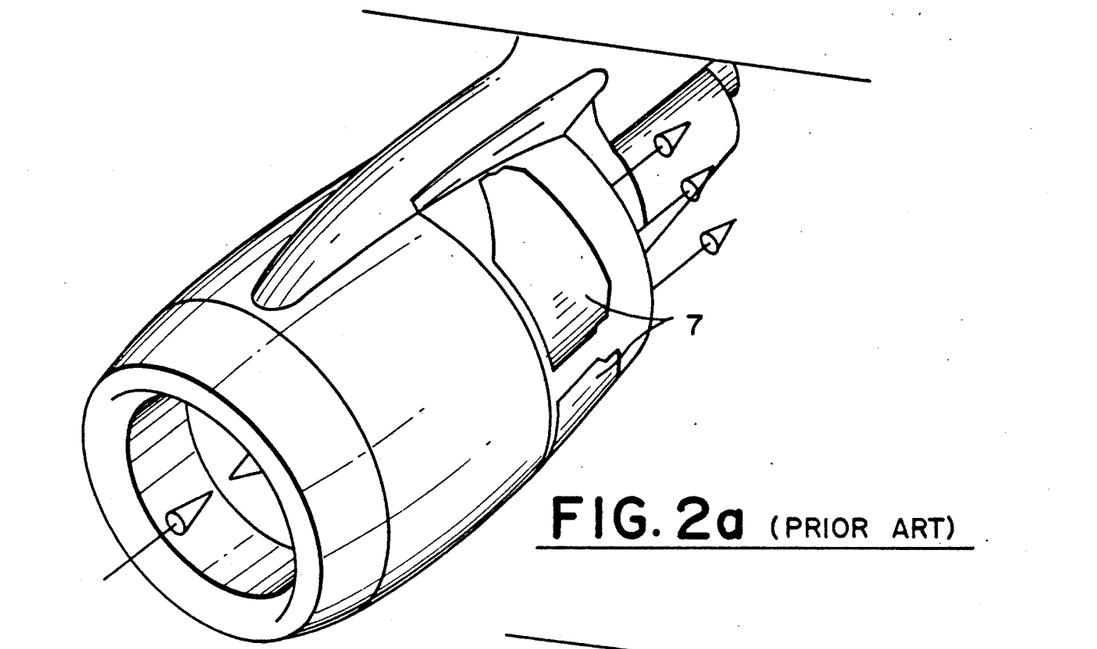
FIG. 2a is a perspective view of a turbofan-type turbojet engine with the thrust reverser doors in their closed, forward thrust positions.
Figure 2B:
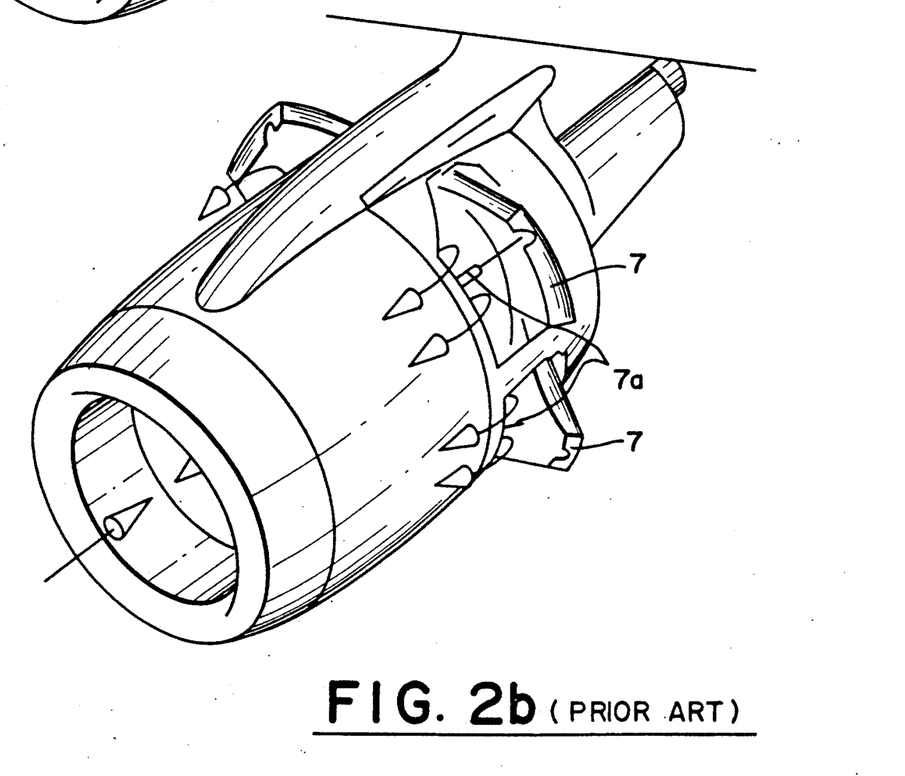
FIG. 2b is a perspective view, similar to FIG. 2a, illustrating the thrust reverser doors in their opened, thrust reversing positions.

A typical prior art installation is illustrated in FIGS. 1, 2a and 2b and comprises annular housing 1, a thrust reverser 2 and a downstream housing portion 3. Housing 1 comprises an outer surface panel 4 and an inner surface panel 5 interconnected by frame structure 6. Similarly, downstream housing portion 3 has an inner surface panel 3a and an outer surface panel 3b.

The thrust reverser 2, comprising a pivotable door 7, extends between housing portion 1 and the downstream housing portion 3 so as to normally cover a generally laterally facing opening when the turbofan engine operates in the forward thrust mode. In this mode, the outer door panel 9 is substantially flush with the outer surface panel 4 and the outer downstream surface panel 3b to provide a smooth air flow, indicated by arrow 10, over the exterior of the housing.

An actuating cylinder 7a is supported on frame structure 6 and has an extendible and retractable piston rod attached to the internal structure 12 of the thrust reverser door 7. Internal structure 12 interconnects the outer door panel 9 with the inner door panel 11, which are also connected at their upstream edges by baffle member 13.

In known fashion, extension of the piston rod of actuator 7a causes the door 7 to pivot with respect to the housing such that its upstream end portion extends outwardly and its downstream end portion extends inwardly to block off the air flow 15 flowing through the cold-flow air duct. The air is redirected by the door outwardly through the lateral opening defined by the annular housing to provide a thrust reversing force.

FIG. 2a illustrates a turbofan engine having the known thrust reverser with the doors 7 in their closed positions, as illustrated in cross section in FIG. 1. The doors 7 are indicated in their opened positions in FIG. 2b during the thrust reversing process. During the thrust reversing operation, a deflection edge 8, extending from the inner housing panel 5, minimizes the turbulence of the air passing outwardly through the opening. Baffle member 13 imparts a forward vector to the air passing through the lateral opening to maximize the efficiency of the door in the thrust reversing mode. In order to maximize the efficiency, baffle member 13 must extend beyond the surface of inner panel 11

When the door 7 is in its closed position, as illustrated in FIG. 1, an internal cavity 16 is formed, bounded by the inner door panel 11, the baffle 13, the deflection edge 8 and a theoretical air flow line 14 extending between the inner surface panel 5 and the inner surface 3a of the downstream housing portion 3. Line 14 represents the ideal theoretical air flow through the cold flow air duct. The presence of cavity 16 causes disturbances in the air 15 flowing through the cold-flow air duct, thereby reducing its efficiency in the forward thrust mode.

Typical examples of such known thrust reversing systems may be found in French Patent 2,559,838 and in U.S. Pat. Nos. 4,410,152 and 4,485,970.

In order to resolve this problem, it has been proposed to provide a movable baffle member on the upstream end of the thrust reverser door, as evidenced in French Patent 2,618,853. While this solution allows the inner door panel to be positioned so as to minimize or eliminate the cavity 16, its structure is more complex.

SUMMARY OF THE INVENTION

The present invention relates to a thrust reverser door for a turbofan-type turbojet engine thrust reversing system defining a gas flow passage between inner and outer panels of the door. The passage, which has an inlet formed through the inner panel of the thrust reverser door and an outlet, directs a portion of the gas flowing through the cold flow air duct in a forward direction. The gas flowing in the forward direction impinges upon the gases flowing through a laterally facing opening in the housing in order to provide a forward component to this gas flow.

The inner and outer panels of the door are fixed with respect to each other such that they undergo no relative movement during the movement of the door between its forward thrust and reverse thrust positions. When the door is in the forward thrust position, its outer panel is substantially flush with the outer surfaces of the housing, while the inner door panel extends substantially along the ideal air flow line interconnecting the inner surfaces of an upstream housing portion and a downstream housing portion.

A moveable flap may be attached to the thrust reverser door in order to cover the inlet to the passageway when the device is operated in the forward thrust mode. The flap, which may be interconnected with the thrust reverser door actuating mechanism, uncovers the inlet to the passageway as the thrust reverser door moves into its open, thrust reversing position. Baffles may also be attached to the thrust reverser door to optimize the direction of the gases flowing through the passageway.

DETAILED DESCRIPTION OF THE PREFERRED EMBODIMENTS

A first embodiment of the thrust reverser door according to the present invention is illustrated in FIGS. 3-6. In these figures, parts in common with the known prior art systems have been indicated by the same numbers as in FIG. 1. These include the upstream housing portion 1 having upstream outer housing surface 4 and upstream inner housing surface 5 interconnected by frame structure 6. Also, downstream housing 3 having inner downstream surface 3a and outer downstream surface 3b are identical to the structure previously discussed. The upstream and downstream terminology relating to the housing refer generally to their positions with respect to the thrust reverser door.

The thrust reverser door 107 is pivotally attached to the housing via known means so as to pivot with respect thereto about generally transverse axis 25. The door 107 has a downstream portion 107b of which inner panel surface 107c and outer panel surface 107d are substantially flush with the downstream inner housing surface 3a and the downstream outer housing surface 3b, respectively.

Figure 3:
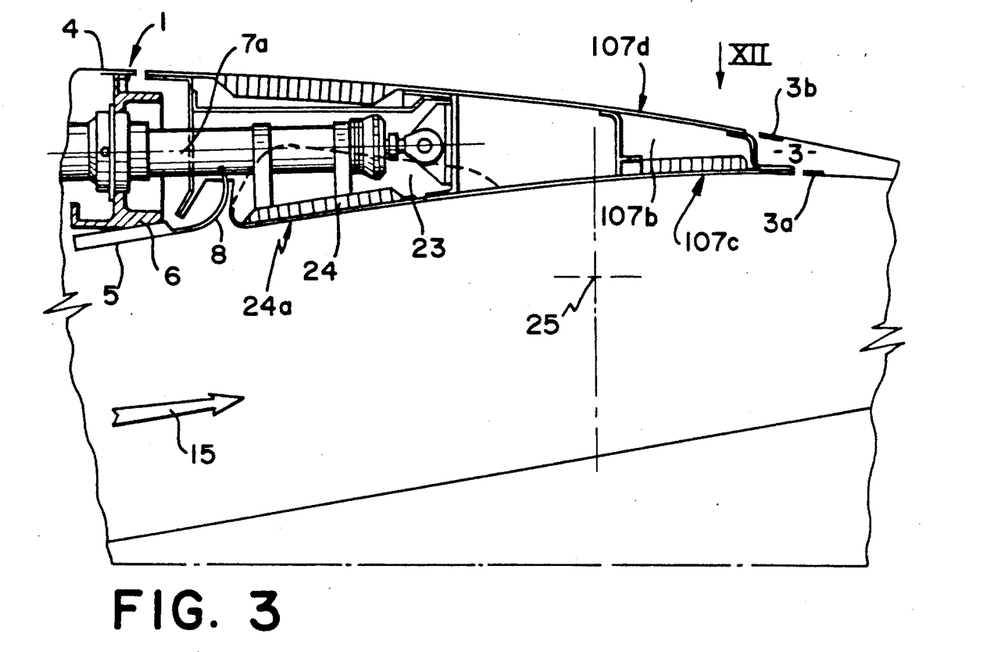
FIG. 3 is a partial, longitudinal cross-sectional view of a turbofan-type turbojet engine housing incorporating a thrust reverser door according to the present invention in a closed, forward thrust position.
Figure 5:
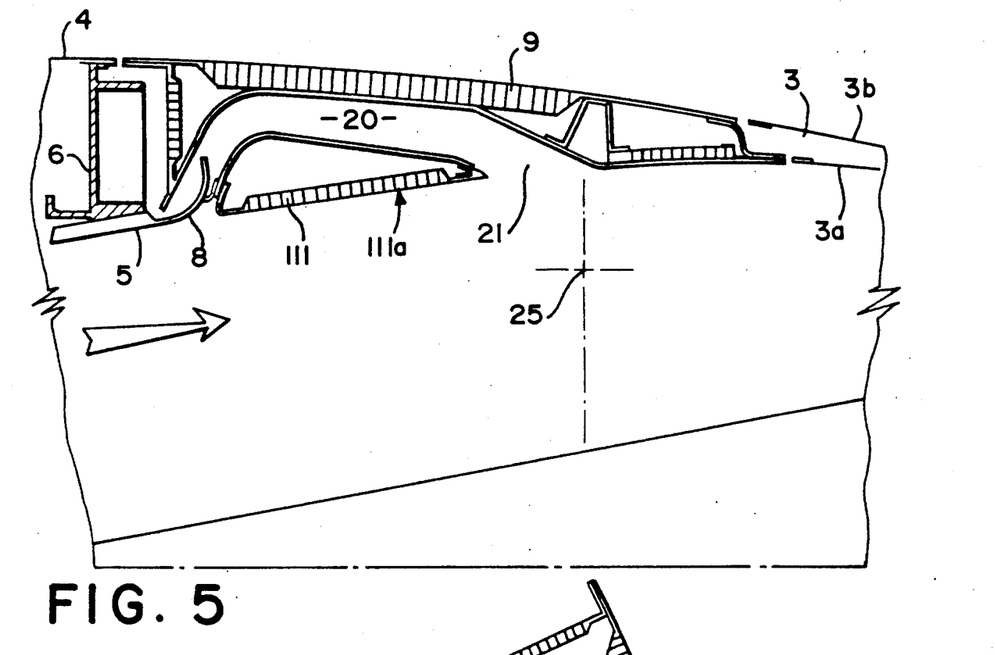
FIG. 5 is a partial, longitudinal cross-sectional view illustrating the passageway in the thrust reverser door of FIG. 3.

When the door 107 is in the closed, forward thrust position, as illustrated in FIGS. 3 and 5, the outer surface of outer door panel 9 is substantially flush with the upstream and downstream outer housing surfaces 4 and 3b, respectively.

A passageway 20 is defined between the outer door panel 9 and the inner door panel 111. The passageway 20 communicates with an inlet opening 21, defined in the inner door panel 111, and an outlet 22. As noted in FIGS. 5 and 6, the inlet 21 is disposed generally downstream of the outlet 22 such that, when the door 107 is in the open, reverse thrust position, a portion 15b of the cold flow air duct gases enters the inlet 21, traverses through the passageway 20 and exits through the outlet 22. The gases exiting the outlet 22 travel in a generally upstream direction and impinge upon the remaining gases 15a passing laterally outwardly through the opening defined by the housing. This imparts to these gases a forward direction to increase the efficiency of the reveres thrust device.

The inner door panel 111 has an inner door surface 111a that extends substantially along the ideal air flow line, illustrated at 14 in FIG. 1. The inner door panel 111, therefore, provides a generally smooth surface to the air flow 15 passing through the cold flow air duct when the door 107 is closed. This eliminates the cavity 16 of the prior art devices and improves the efficiency of the engine during forward thrust operations.

Figure 6:
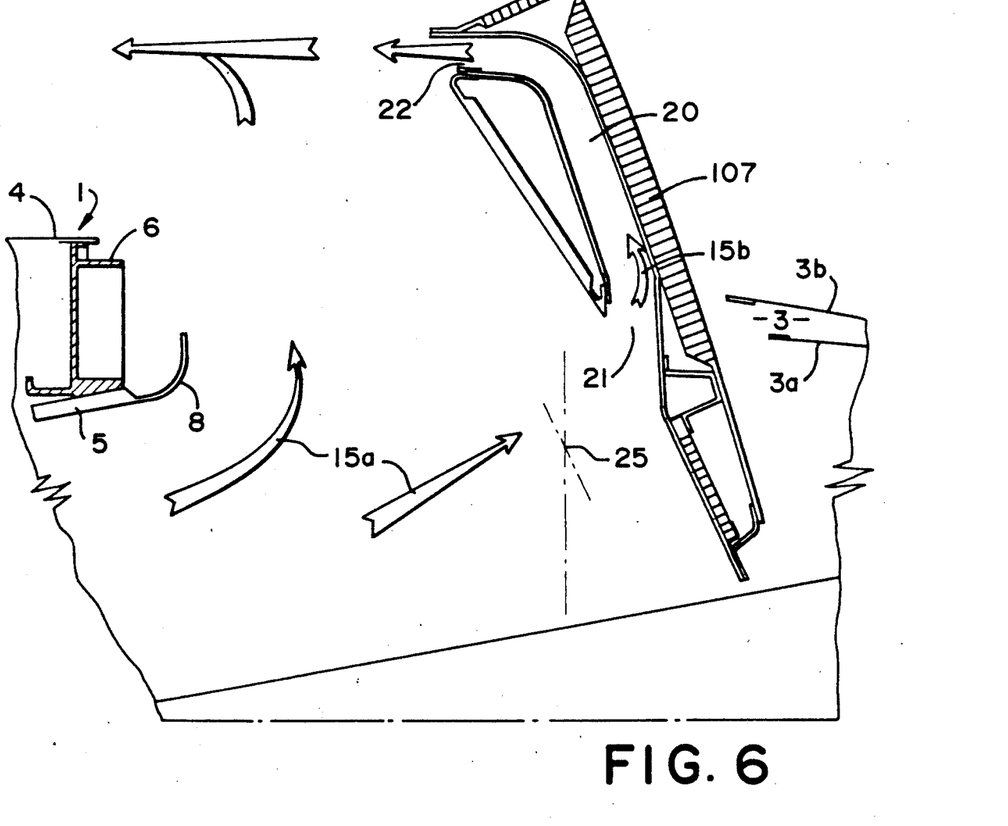
FIG. 6 is a partial, longitudinal cross-sectional view illustrating the passageway in the thrust reverser door of FIG. 4.
Figure 7:
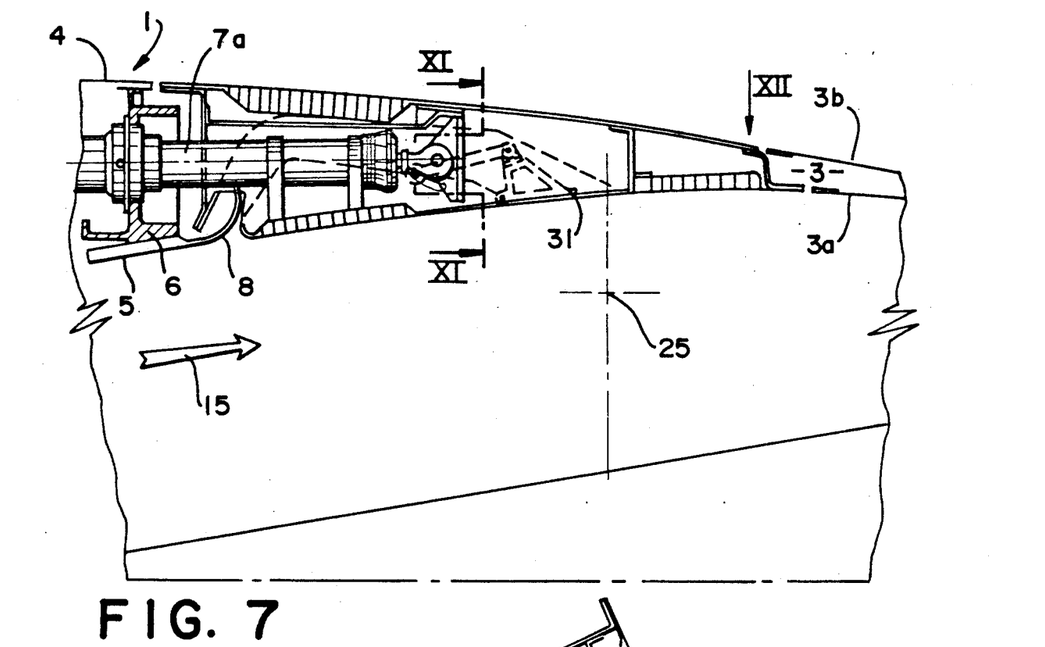
FIG. 7 is a partial, longitudinal cross-sectional view illustrating a second embodiment of the thrust reverser door according to the present invention.
Figure 8:
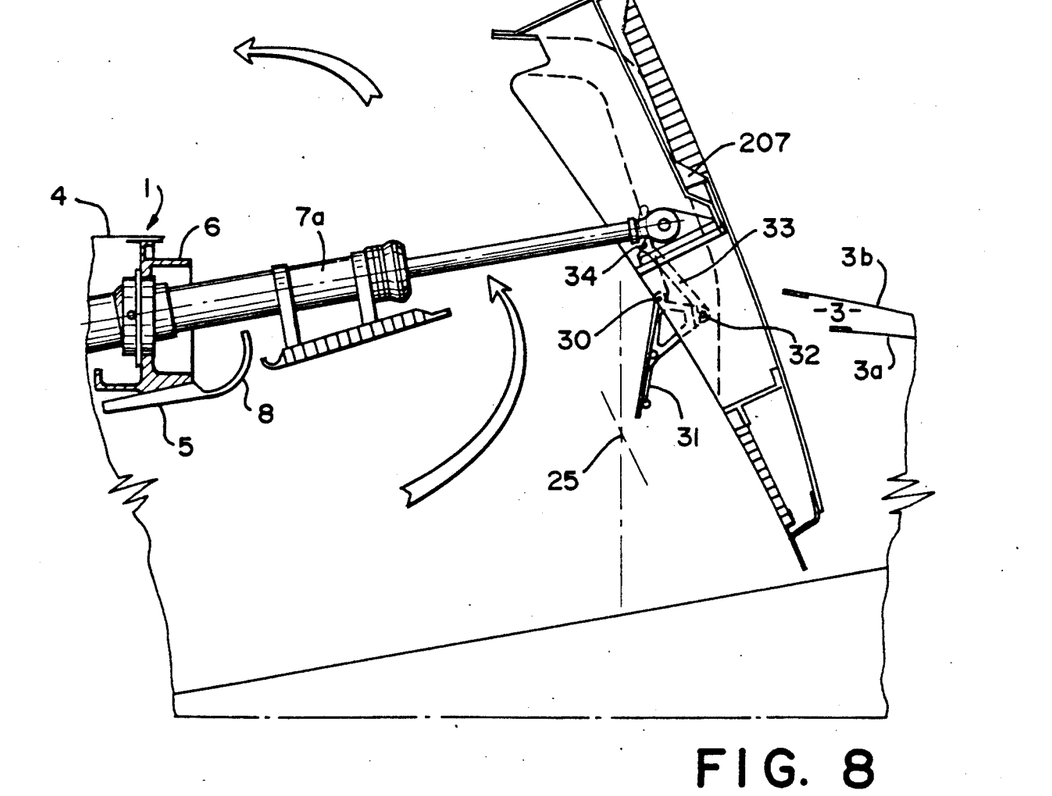
FIG. 8 is a partial, longitudinal cross-sectional view of the door shown in FIG. 7 in its opened, reverse thrust position.

The positions of inner door panel 111 and outer door panel 9 are fixed relative to each other. The respective door panels undergo no relative movement as the door 107 is moved between its closed and open positions as illustrated in FIGS. 5 and 6. The portion of the gas flow 15b emanating from outlet 22 impinges on the gas flow 15a passing through the lateral opening to impart a forward direction to this gas flow. Thus, the need for a baffle 13 of the prior art systems and the resultant cavity 16 are eliminated.

The actuating cylinder 7a attached to frame structure 6, has an extendible and retractable piston rod attached to the door 107 as in the prior art teachings. The door 107 may define a tunnel 23 to accommodate the cylinder.

Passages 20 may be defined on either side of the actuating cylinder 7a. A plate 24 is secured to the cylinder 7a, as illustrated in FIG. 3. The plate 24 has an inner surface 24a substantially flush with the surface 111a of the inner door panel 111. When the door 107 is in its closed position, as illustrated in FIG. 3, the inner surface 24a, along with the inner panel surface 111a and the downstream surface 107c, extend substantially along the ideal air flow line to provide a substantially smooth surface for the gases flowing through the air duct.

Figure 4:
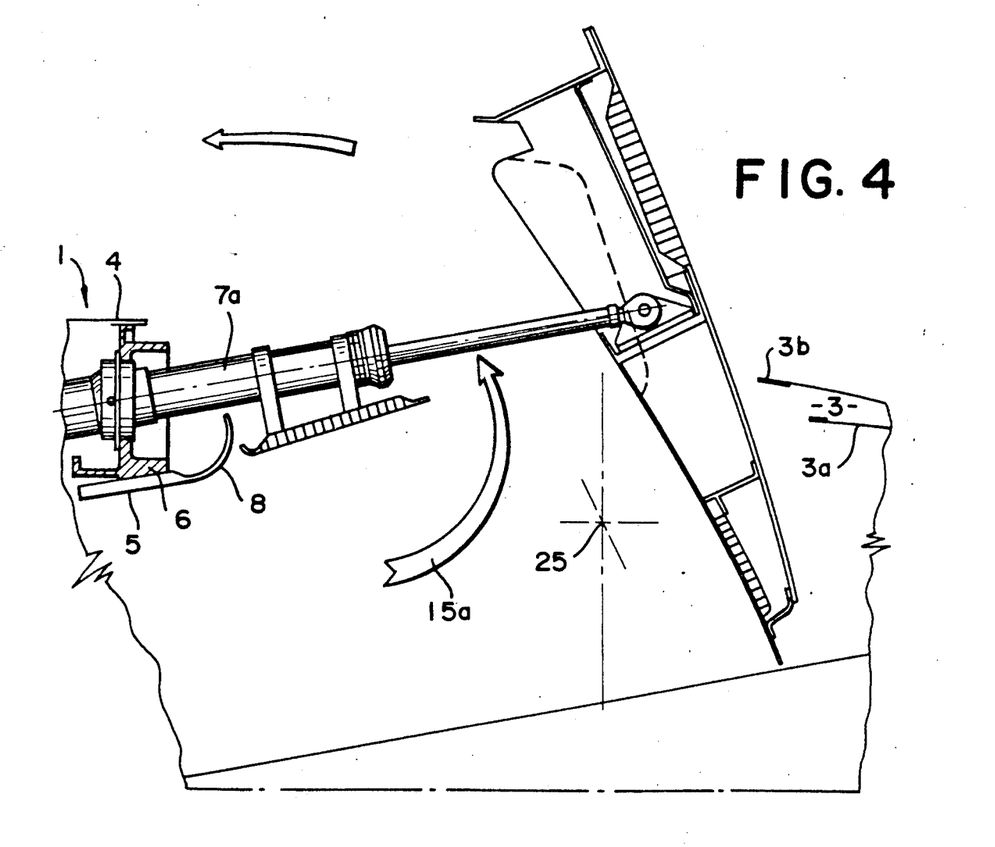
FIG. 4 is a partial, longitudinal cross-sectional view similar to FIG. 3, but showing the thrust reverser door in the open, thrust reversing position.
Figure 12:
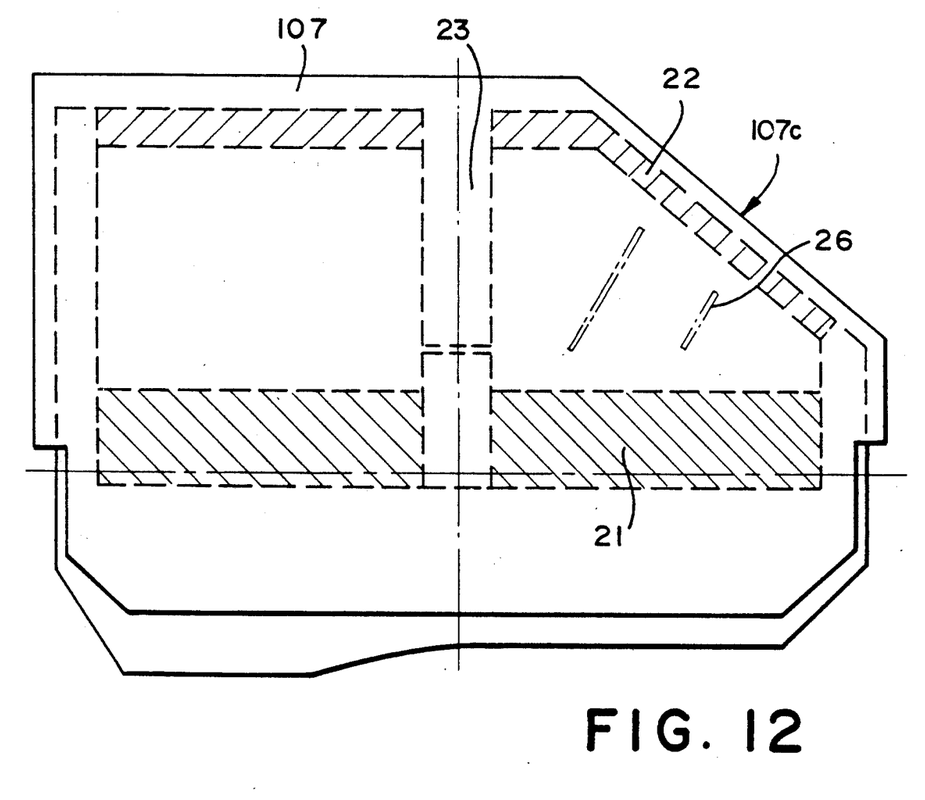
FIG. 12 is a view in the direction of arrow XII in FIGS. 3 and 7 illustrating the thrust reverser door according to the invention.

The cross-sectional view of FIGS. 3 and 4 are taken along a generally radial plane extending through the circumferential position of the actuator 7a. The cross-sections of FIGS. 5 and 6 are circumferentially displaced from that of FIGS. 3 and 4 to more clearly illustrate the function of the passageways 20. As illustrated in FIG. 12, the door 107 may include baffles 26 extending across the passageway 20 to optimize the direction of flow through the passageways.

The embodiment of the invention illustrated in FIGS. 7-10 is similar to that illustrated in FIGS. 3-6, except that a flap 31 is included in the door structure to cover the inlet 21 of the passageways 20 when the door 207 is in its closed, forward thrust position. This provides a substantially smooth interior surface to the gases 15 flowing through the duct.

Figure 9:
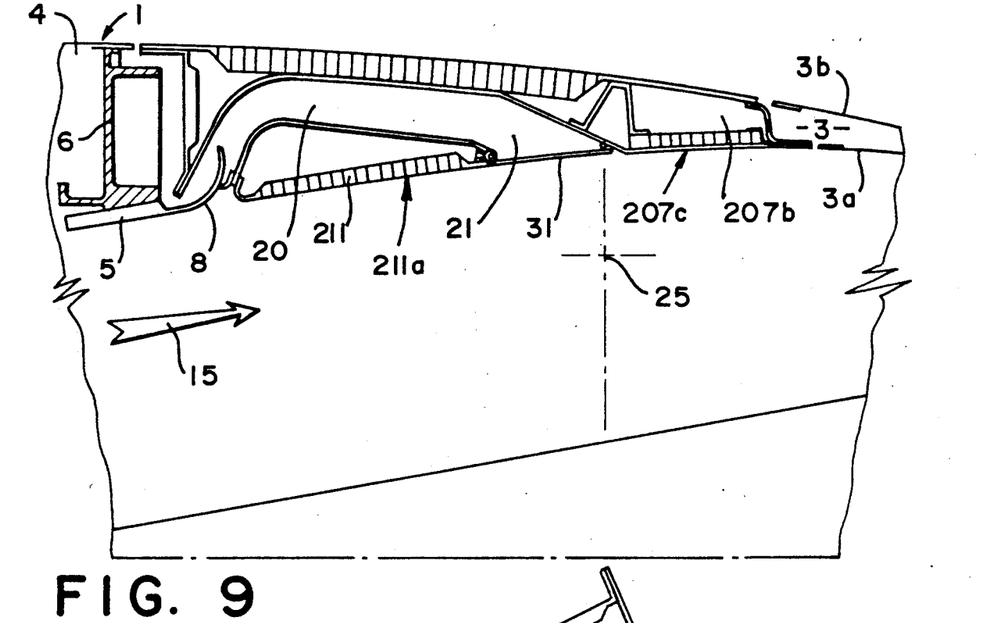
FIG. 9 is a partial, longitudinal cross-sectional view of the door shown in FIG. 7 illustrating the passageway defined by the door.
Figure 10:
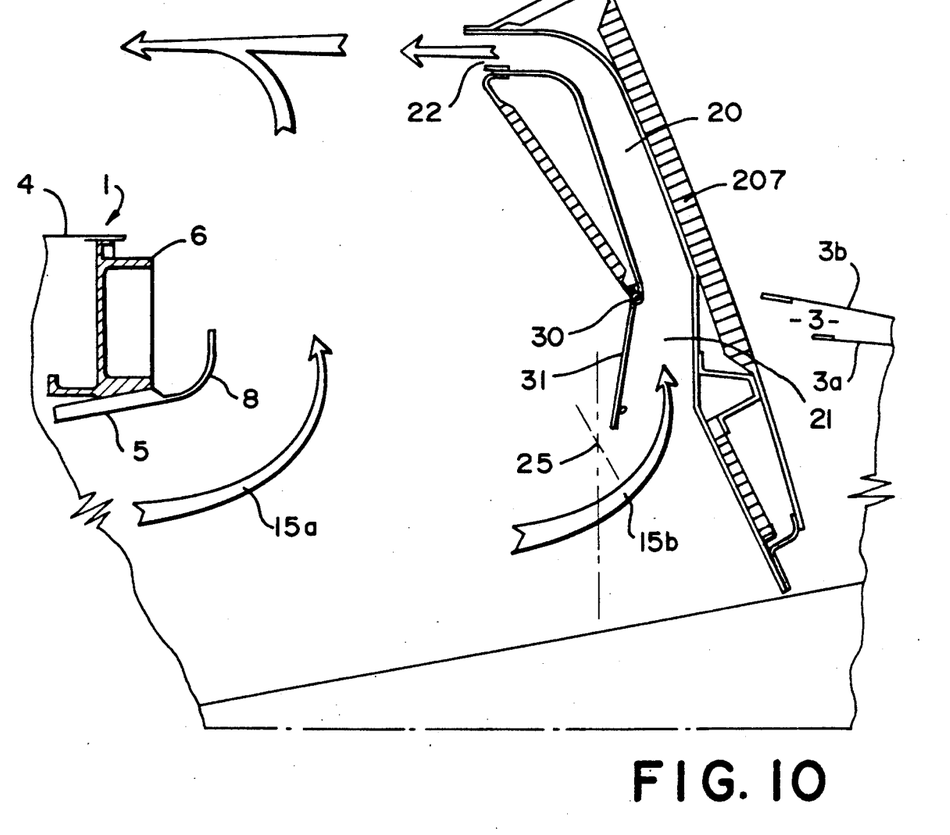
FIG. 10 is partial, longitudinal cross-sectional view showing the door of FIG. 9 in its opened position.
Figure 11:
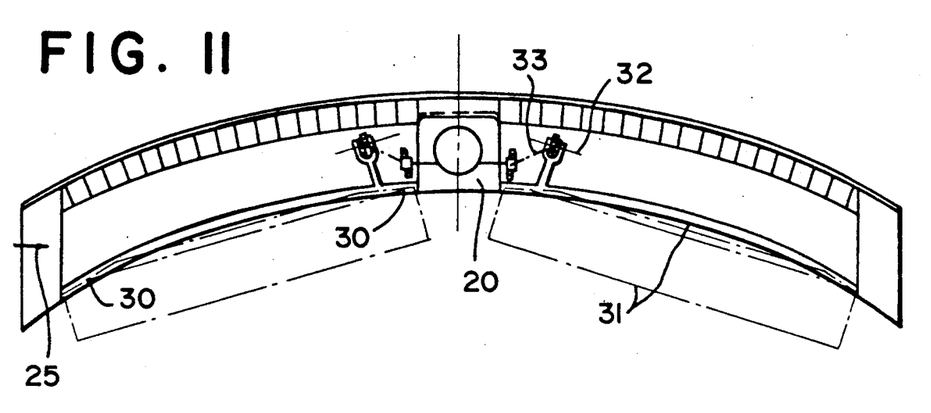
FIG. 11 is a partial, transverse cross-sectional view taken along line XI—XI in FIG. 7.

In this embodiment, door 207 has outer door panel 9 and inner door panel 211 which defines inner surfaces 211a and 207c. As in the previous embodiment, the relative positions of outer door panel 9 and inner door panel 211 are fixed. Passageway 20 is defined between inner panel 211 and outer panel 9, and has an inlet 21 and outlet 22 as previously described. A moveable flap 31 is pivotally attached to the inner door panel by pivot means 30 such that the flap 31 is moveable between closed and opened positions. In the closed position, as illustrated in FIG. 9, the flap 31 covers the inlet 21 of the passageway 20 when the door 207 is its closed, forward thrust position. When the door 207 is opened to its thrust reversing position, as illustrated in FIG. 10, the flap 31 is opened to enable a portion of the gases 15b to enter the passageway 20 through inlet 21.

Means are provided to connect the moveable flap 31 and the actuator 7a to move the flap between its open and closed positions as the thrust reverser door 207 is moved between its open and closed positions. This means may comprise a link rod 33 having a first end 32 pivotally attached to the flap 31 and a second end 34 attached to the end of the piston rod of the actuator 7a. Accordingly, when the piston rod is extended to move the door 207 from its closed position to its opened position, the flap 31 is moved from its closed position to its opened position. The open position of the flap 31 may be adjusted such that it may act as a scoop for the reverse flow gases in order to precisely adjust the proportion of the gases passing through the passageway 20.

The foregoing description is provided for illustrative purposes only and should not be construed as in any way limiting this invention, the scope of which is defined solely by the appended claims.

We claim:

1. A thrust reverser for a turbojet engine having a housing extending along a longitudinal axis and defining at least one generally laterally facing opening, an upstream outer housing surface and an upstream inner housing surface located upstream of the laterally facing opening, and a downstream outer housing surface and a downstream inner housing surface located downstream of the laterally facing opening, the upstream and downstream inner surfaces defining a boundary of a gas flow stream, comprising:
   a) a thrust reverser door having an outer door panel and an inner door panel;
   b) attaching means to pivotally attach the thrust reverser door to the housing so as to be movable between a closed position wherein the thrust reverser door covers the generally laterally facing opening and an open position wherein the thrust reverser door directs the gas flow stream outwardly through the generally laterally facing opening;
   c) means affixing the inner and outer door panels together such that they undergo no motion relative to each other as the thrust reverser door moves between its open and closed positions, and oriented such that, when the thrust reverser door is in its closed position, the inner door panel lies along an ideal gas flow line connecting the upstream and downstream inner housing surfaces;
   d) means defining at least one passageway in the thrust reverser door between the inner and outer door panels, the passageway having an inlet defined by the inner door panel and an outlet to direct a portion of the gas flow in an upstream direction when the thrust reverser door is in its open position; and,
   e) actuator means operatively interposed between the housing and the thrust reverser door to move the thrust reverser door between its open and closed positions.

2. The thrust reverser according to claim 1 further comprising means defining a plurality of passageways in each thrust reverser door, at least one passageway located on either side of the actuator means.

3. The thrust reverser according to claim 1 further comprising at least one baffle attached to the thrust reverser door so as to optimize the direction of gas flow through the passageway.

4. The thrust reverser according to claim 1 further comprising:
   a) flap means pivotally attached to the thrust reverser door so as to be movable between a closed position wherein the flap covers the passageway inlet and an open position wherein the passageway inlet is uncovered;
   b) connecting means connecting the flap means and the actuator means such that the flap means is closed when the thrust reverser is closed and the flap means is open when the thrust reverser door is in its open position.

5. The thrust reverser door according to claim 4 wherein the connecting means comprises a link rod having a first end pivotally attached to the flap means and a second end attached to the actuator means.

* * * * *

UNITED STATES PATENT AND TRADEMARK OFFICE
CERTIFICATE OF CORRECTION

PATENT NO. : 5,040,730

DATED : August 20, 1991

INVENTOR(S) : Hogie et al.

It is certified that error appears in the above-identified patent and that said Letters Patent is hereby corrected as shown below:

In the Abstract, line 4, change "passae" to "passage".

Signed and Sealed this

Second Day of November, 1993

Attest:

BRUCE LEHMAN

*Attesting Officer*     *Commissioner of Patents and Trademarks*